(12) United States Patent
Akiyama (10) Patent No.: US 9,541,819 B2
(45) Date of Patent: Jan. 10, 2017

(54) ILLUMINATOR AND PROJECTOR FOR PREVENTING A SHIFT OF AN ILLUMINATION REGION

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 4 days.

(21) Appl. No.: 14/625,269

(22) Filed: Feb. 18, 2015

(65) Prior Publication Data

US 2015/0234266 A1    Aug. 20, 2015

(30) Foreign Application Priority Data

Feb. 20, 2014 (JP) ................................. 2014-030617

(51) Int. Cl.

| G03B 21/20 | (2006.01) |
| G02B 5/20 | (2006.01) |
| G02B 27/09 | (2006.01) |
| F21W 131/30 | (2006.01) |
| F21Y 101/00 | (2016.01) |

(52) U.S. Cl.
CPC ........... *G03B 21/2033* (2013.01); *G02B 5/203* (2013.01); *G02B 27/0961* (2013.01); *G03B 21/208* (2013.01); *G03B 21/2013* (2013.01); *F21W 2131/30* (2013.01); *F21Y 2101/00* (2013.01)

(58) Field of Classification Search
CPC ............ G03B 21/2013; G03B 21/2033; G03B 21/208;F21W 2131/30; F21Y 2101/02; G02B 27/0961; G02B 5/203
See application file for complete search history.

(56) References Cited

U.S. PATENT DOCUMENTS

| 6,497,488 B1* | 12/2002 | Yamauchi ......... G02F 1/133526 |
| | | 348/E9.027 |
| 2004/0201826 A1 | 10/2004 | Nishida et al. |
| 2014/0232996 A1* | 8/2014 | Okamoto ............... G02B 27/48 |
| | | 353/85 |

FOREIGN PATENT DOCUMENTS

| CN | 1530707 A | 9/2004 |
| JP | 2003-149594 A | 5/2003 |
| JP | 2003-218017 A | 7/2003 |
| JP | 2012-009872 A | 1/2012 |

* cited by examiner

*Primary Examiner* — Sultan Chowdhury
*Assistant Examiner* — Magda Cruz
(74) *Attorney, Agent, or Firm* — Oliff PLC (57) ABSTRACT

An illuminator includes a light source section having at least one solid-state light source, a multi-lens array provided in a position downs ream of a diffractive optical member and having a plurality of lenses, and a superimposing system provided in a position downstream of the multi-lens array. The diffractive optical member divides light from the light source section into a plurality of sub-light fluxes corresponding to the plurality of lenses. Each of the plurality of sub-light fluxes is incident on a corresponding lens. The plurality of sub-light fluxes having passed through the multi-lens array are superimposed on one another on an illumination receiving region through the superimposing system.

10 Claims, 5 Drawing Sheets

ILLUMINATOR AND PROJECTOR FOR PREVENTING A SHIFT OF AN ILLUMINATION REGION

BACKGROUND

1. Technical Field

The present invention relates to an illuminator and a projector.

2. Related Art

A projector is an apparatus in which a light modulator modulates light outputted from a light source section in accordance with image information and a projection lens enlarges and projects the resultant image. In recent years, as a light source in an illuminator used in such a projector, a semiconductor laser (LD) or any other laser light source that produces high-luminance, high-intensity light has received attention.

To achieve a projector including an illuminator formed of such a laser light source, there is a known technology using a diffractive optical element to reduce the degree of interference fringes (see JP-A-2012-9872, for example).

In the illuminator described above, however, any variation in the position of the mounted laser light source or collimator lens undesirably shifts the direction of the principal ray of light incident from the laser light source on the diffractive optical element. A region illuminated with the light therefore greatly shifts, resulting in a problem of decrease in illumination efficiency.

SUMMARY

An advantage of some aspects of the invention is to provide an illuminator and a projector capable of suppressing a decrease in illumination efficiency due to the mounting variation.

According to a first aspect of the invention, there is provided an illuminator including a light source section having at least one solid-state light source, a diffractive optical member having a plurality of regions, a multi-lens array provided in a position downstream of the diffractive optical member and having a plurality of lenses corresponding to the plurality of regions in a one-to-one relationship, and a superimposing system provided in a position downstream of the multi-lens array. The plurality of regions of the diffractive optical member divide a light flux incident from the light source section into a plurality of sub-light fluxes. Each of the plurality of sub-light fluxes is incident on a corresponding lens of the plurality of lenses. A predetermined region of a predetermined plane is illuminated with the plurality of sub-light fluxes having passed through the multi-lens array in such a way that the plurality of sub-light fluxes are superimposed on one another through the superimposing system. Each of the plurality of regions is optically conjugate with the predetermined region.

According to the configuration of the illuminator related to the first aspect, light from the light source section is divided into a plurality of sub-light fluxes, and each of the plurality of sub-light fluxes is incident on a corresponding lens of the plurality of lenses. Further, the plurality of sub-light fluxes having passed through the multi-lens array are superimposed by the superimposing system on one another on an illumination receiving region. In this configuration, for example, even when the angle of incidence of the light incident on the diffractive optical member shifts owing to the variation of the alignment of the mounted light source section, the illumination receiving region will, not shift. The thus provided illuminator is reliable in that the illumination receiving region can foe efficiently illuminated with the light from the light source section and no high alignment precision is required. Further, since the diffractive optical member illuminates each of the lenses in a relatively uniform manner over a wide area, the provided illuminator reduces speckle.

In the first aspect described above, each of the plurality of lenses may have refractive power at least in a diffraction direction of the diffractive optical member.

According to the configuration described above, since the direction in which light is diffracted coincides with the direction in which the light is refracted, the optical axis of the light from the light source section can be readily aligned.

In the first aspect described above, the diffractive optical member may be configured to shape the plurality of sub-light fluxes, According to the configuration described above, the plurality of shaped sub-light fluxes are allowed to be reliably incident on the illumination receiving region.

In the aspect described above, a first sub-light flux of the plurality of sub-light fluxes may be produced by a first region of the plurality of regions, and the first region may be so configured that when the first sub-light flux is incident on a corresponding first lens of the plurality of lenses, the cross-sectional shape of the first sub-light flux has become closer to an outer shape of the first lens than the cross-sectional shape immediately after the first sub-light flux is produced by the first region.

According to the configuration described above, the first sub-light flux is allowed to be incident on the first lens with the first sub-light flux enlarged.

In the first aspect described above, at least one collimator lens may be disposed between the light source section and the diffractive optical member.

According to the configuration described above, since the collimator lens can parallelize the light from the light source section, the light having exited out of the diffractive optical member is allowed to be efficiently incident on a desired lens.

According to a second aspect of the invention, there is provided a projector including an illuminator that radiates illumination light, a light modulator that modulates the illumination light in accordance with image information to form image light, and a projection system that projects the image light, and the illuminator according to the first aspect is used as the illuminator.

Since the configuration of the projector related to the second aspect includes any of the illuminators described above, the performance of the projector itself, for example, suppression of decrease in illumination efficiency and reduction in the amount of speckle, can be improved, whereby the projector can display an image having excellent quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below in detail with reference to the drawings.

In the drawings used in the following description, a characteristic portion is enlarged for convenience in some cases for clarify of the characteristic thereof, and the dimension ratio and other factors of each component are therefore not always equal to actual values.

Projector

An example of a projector 100 shown in FIG. 1 will first be described.

Figure 1:
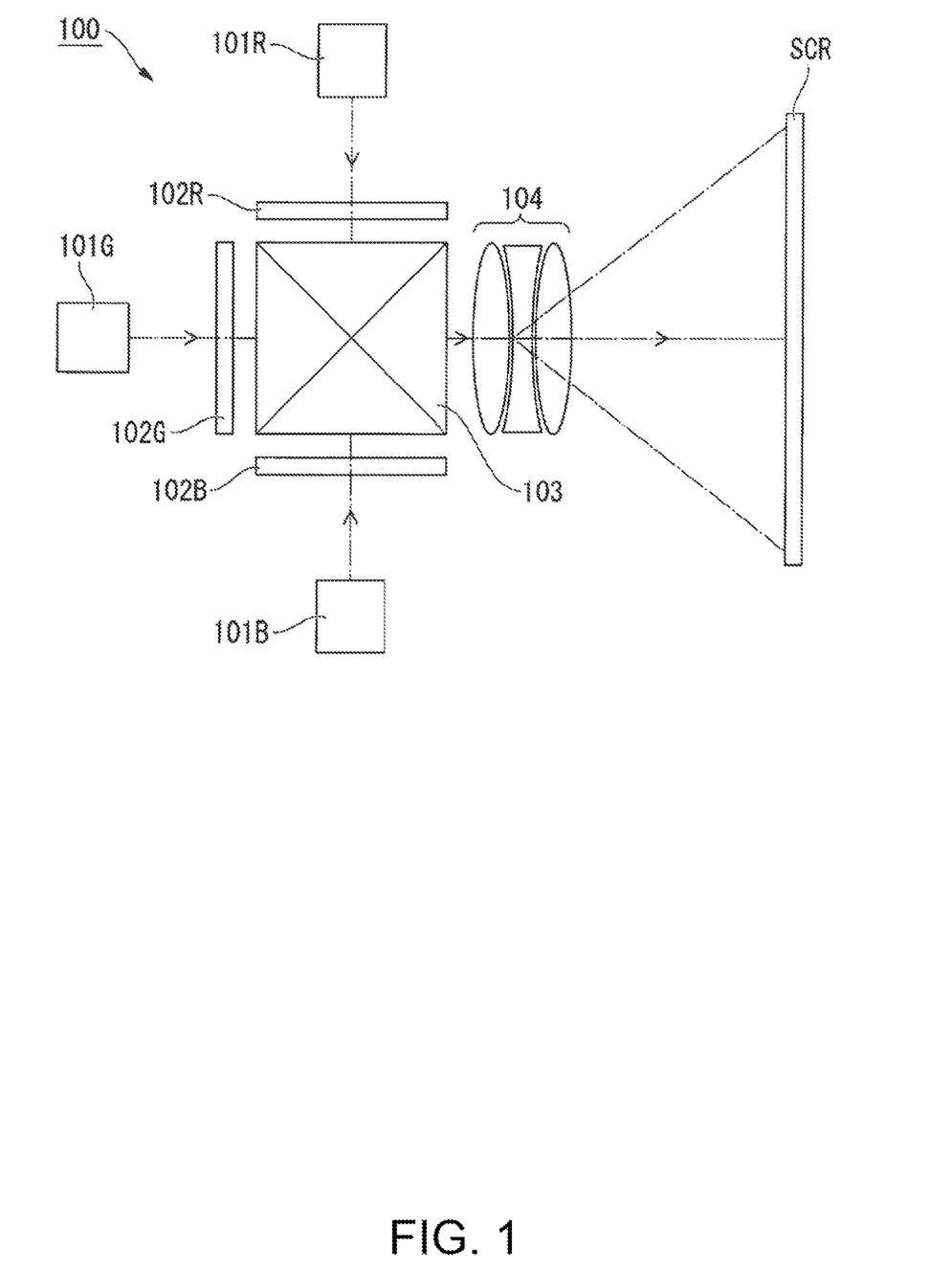
FIG. 1 shows a schematic configuration of a projector.

FIG. 1 is a plan view showing a schematic configuration of the projector 100.

The projector 100 according to the present embodiment is a projection-type image display apparatus that displays color video images (still images) on a screen (projection receiving surface). A semiconductor laser (LD) or any other laser light source capable of emitting high-luminance, high-intensity light is used as a light source of an illuminator provided in the projector 100.

Specifically, the projector 100 includes illuminators 101R, 101G, and 101B, light modulators 102R, 102G, and 102B, a light combining system 103, and a projection system 104.

The illuminators 101R, 101G, and 101B output laser beams (illumination light fluxes) corresponding to red (R), green (G), and blue (B), respectively.

The illuminators 101R, 101G, and 101B basically have the same configuration except that they use semiconductor lasers corresponding to red (R), green (G), and blue (B) as the light sources, as will be described later. The illuminators 101R, 101G, and 101B radiate the illumination light fluxes toward the light modulators 102R, 102G, and 102B, respectively.

The light modulators 102R, 102G, and 102B modulate the laser beams from the illuminators 101R, 101G, and 101B in accordance with image signals to form image light fluxes corresponding to the colors.

The light modulators 102R, 102G, and 102B are each formed of a liquid crystal light valve (liquid crystal panel) and modulate the illumination light fluxes corresponding to the colors in accordance with image information to form image light fluxes. Polarizers (not shown) are disposed on the light incident side and the light exiting side of each of the light modulators 102R, 102G, and 102B.

The light combining system 103 combines the image light fluxes from the light modulators 102R, 102G, and 102B with one another.

The light combining system 103 is formed of a cross dichroic prism and receives the image light fluxes from the light modulators 102R, 102G, and 102B. The light combining system 103 combines the image light fluxes corresponding to the colors with one another and outputs the combined image light toward the projection system 104.

The projection system 104 is formed of a group of projection lenses and enlarges and projects the combined image light from the light combining system 103 toward a screen SCR. Enlarged color video images (still images) are thus displayed on the screen SCR.

Illuminator

A description will be subsequently made of specific configurations of the illuminators 101R, 101G, and 101B.

The illuminators 101R, 101G, and 101B basically have the same configuration except that they use semiconductor lasers corresponding to red (R), green (G), and blue (B) as the light sources, as described above.

Therefore, in the following description, the configuration of the illuminator 101R will be described by way of example, and no detailed description of the illuminator 101G or 101B will be made.

Figure 2:
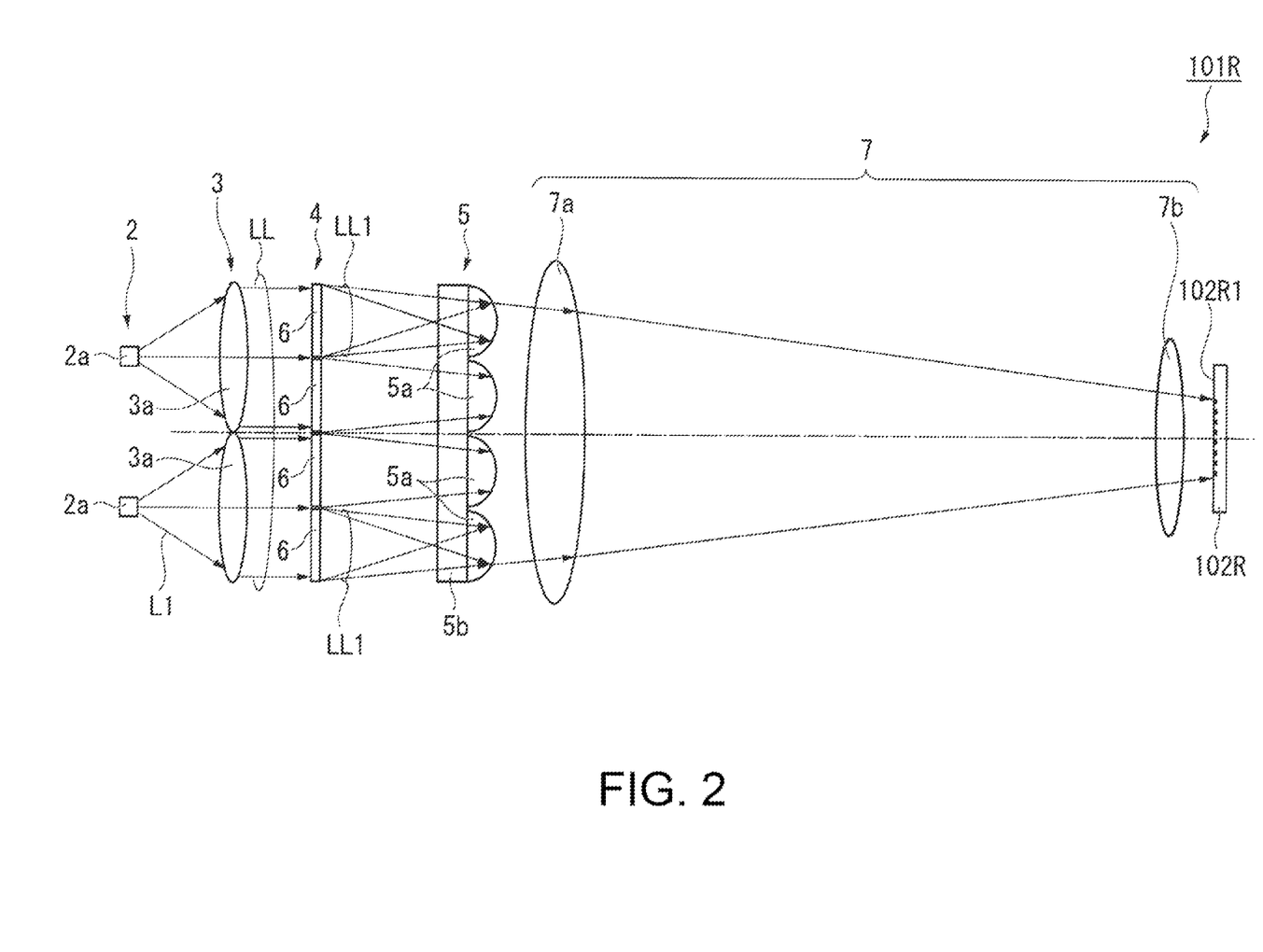
FIG. 2 shows a schematic configuration of an illuminator.

FIG. 2 shows a schematic configuration of the illuminator 101R.

The illuminator 101R includes an array light source (light source section) 2, a collimator system 3, a diffractive optical member 4, a multi-lens array 5, and a superimposing system 7, as shown in FIG. 2.

The array light source 2 includes a plurality of semiconductor lasers (solid-state light sources) 2a two-dimensionality arranged in a plane perpendicular to an optical axis. Light emitted from each of the semiconductor lasers 2a is coherent linearly polarized light and emitted in parallel to each other.

Each of the semiconductor lasers 2a emits a red laser beam L1 having a predetermined polarization direction. The laser beam L1 has an elliptical cross-sectional shape when viewed in a plane perpendicular to the optical axis of the laser beam L1.

Each of the semiconductor lasers 2a in the illuminator 101G emits green light having a predetermined polarization direction toward a light incident surface of the collimator system 3, and each of the semiconductor lasers 2a in the illuminator 101B emits blue light having a predetermined polarization direction toward the light incident surface of the collimator system 3. In the present embodiment, the semiconductor lasers 2a in the illuminators 101R, 101G, and 101B emit beams having the same polarization direction.

The collimator system 3 is formed of a plurality of collimator lenses 3a arranged in correspondence with the semiconductor lasers 2a in a one-to-one relationship. A light ray flux of the laser beam L1 emitted from each of the semiconductor lasers 2a is incident on the corresponding collimator lens 3a, which converts the light ray flux into a parallelized light flux, which is then incident on the diffractive optical member 4.

Figure 3A:
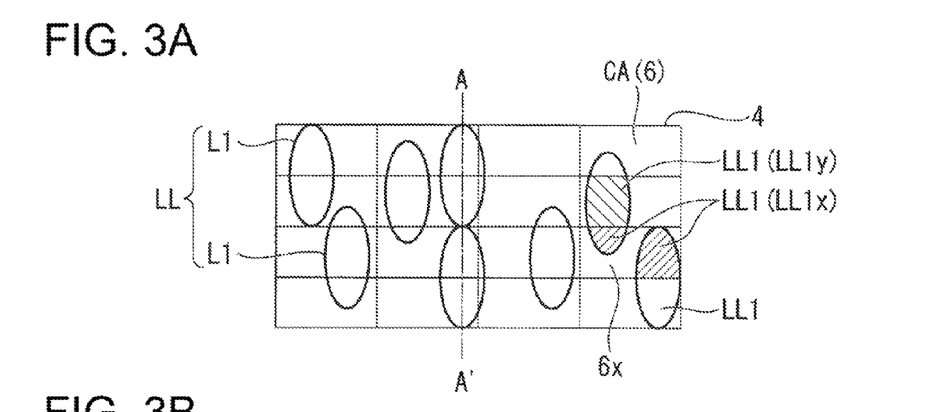
FIG. 3A shows a diffractive optical member and a cross section of sub-light fluxes immediately after they are produced by the diffractive optical member.

FIG. 3A shows the diffractive optical member 4 and a cross section of sub-light fluxes LL1 immediately after they are produced by the diffractive optical member 4. In the present embodiment, the diffractive optical member 4 has a plurality of regions CA. Each of the regions CA includes a diffractive optical element 6. In the present embodiment, for example, 16 regions CA are arranged in a matrix of 4 rows and 4 columns. The light modulator 102R has a light incident surface (illumination receiving region) 102R1. In the embodiment of the invention, a plane containing the light incident surface 102R1 corresponds to a predetermined plane. The shape of each of the regions CA (diffractive optical elements 6) is similar to the shape of the light incident surface 102R1 of the light modulator 102R.

Each of the diffractive optical elements 6 is formed of a computer generated hologram (CGH). The diffractive optical element 6 is formed, for example, of a surface-relief-type hologram element having a minute protrusion/indentation structure designed by a computer on a surface of a base made of quartz (glass), a synthesized resin, or any other light transmissive material. The diffractive optical element 6 is also a wavefront converter that converts the wavefront of light incident thereon based on a diffraction phenomenon. A phase-modulation-type CGH, in particular, can perform the wavefront conversion with the energy of an incident light wave hardly lost. The CGH can therefore provide a uniform intensity distribution or an intensity distribution having a simple shape.

The diffractive optical element 6 allows a diffractive element pattern to have a desired diffusing function through appropriate adjustment of design conditions including the width of the indentations and the depth thereof (height of protrusions). Examples of an approach for optimizing conditions under which the diffractive element pattern is set may include an iterative Fourier algorithm and other computation approaches.

Figure 3B:
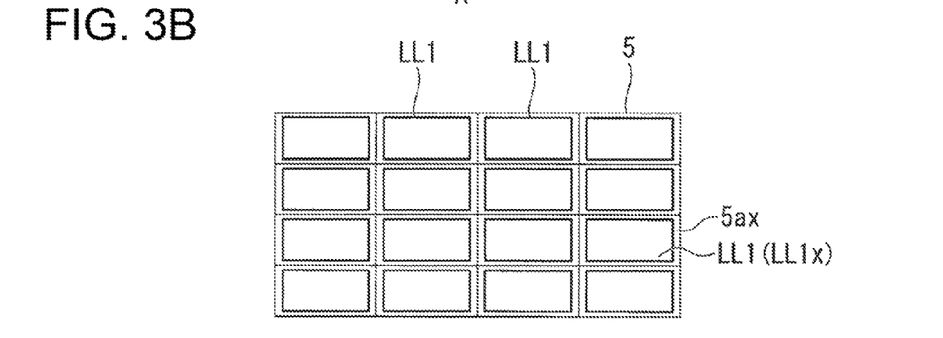
FIG. 3B shows a multi-lens array and a cross section of the sub-light fluxes incident on the multi-lens array.

The multi-lens array 5 has a plurality of microlenses 5a (hereinafter simply referred, to as lenses 5a) arranged in a matrix of 4 rows and 4 columns in correspondence with the diffractive optical elements 6. The lenses 5a are held as an integral unit by a lens base 5b. Each of the lenses 5a has refractive power at least in the diffraction direction of the corresponding diffractive optical element 6. Since the direction in which light is diffracted coincides with the direction in which the light is refracted, the optical axes of the light fluxes from the array light source 2 can be readily aligned with one another.

The superimposing system 7 is formed of two lenses, a superimposing lens 7a and a field lens 7b.

In the present embodiment, the array light source 2 includes 8 semiconductor lasers 2a, and a light flux LL is formed of 8 laser beams L1. To uniformly illuminate the light incident surface 102R1, each of the laser beams L1 is configured to overlap with two diffractive optical elements 6 adjacent to each other, as shown in FIG. 3A. The light flux LL having been incident on the diffractive optical member 4 is divided by the plurality of diffractive optical elements 6 into a plurality of sub-light fluxes LL1 corresponding to the lenses 5a of the multi-lens array 5.

FIG. 2 shows a cross section of the illuminator 101R taken along a plane A-A' shown in FIG. 3A. In the present embodiment, the 16 diffractive optical elements 6 are arranged in a matrix of 4 rows and 4 columns, and the 8 laser beams 11 are arranged as shown in FIG. 3A, but the numbers and arrangements of the diffractive optical elements 6 and the laser beams Li are not limited thereto. The number of diffractive optical elements 6, the number of semiconductor lasers 2a, the arrangement of the diffractive optical elements 6, and the arrangement of the laser beams L1 can be changed as appropriate. The number of semiconductor lasers 2a may be one. The number of diffractive optical elements 6 (regions CA) only needs to be at least two. The relationship between the longitudinal direction of the diffractive optical elements 6 and the major axis direction of the elliptical cross-sectional shape of the laser beams L1 can also be changed as appropriate.

FIG. 3B shows the multi-lens array 5 and a cross section of the sub-light fluxes LL1 incident on the multi-lens array 5. For example, a sub-light flux LL1$x$ (first sub-light flux) is produced by a diffractive optical element 6$x$ (first region). The diffractive optical element 6$x$ and the sub-light flux LL1$x$ correspond, to a lens 5a$x$ (first lens). The sub-light flux LL1$x$ is formed of two light fluxes immediately after the sub-light flux LL1$x$ is produced by the diffractive optical element 6$x$, as shown in FIG. 3A, and then so shaped by the diffractive optical element 6$x$ that a relatively large area of the lens 5a$x$ is irradiated when the shaped light flux is incident on the lens 5a$x$, as shown in FIG. 3B.

Specifically, the diffractive optical element 6$x$ is so configured that when the sub-light flux LL1$x$ is incident on the lens 5a$x$, the cross-sectional shape of the sub-light flux LL1$x$ has become closer to the outer shape of the lens 5a$x$ than the cross-sectional shape immediately after the sub-light flux LL1$x$ is produced by the diffractive optical element 6$x$ (see FIG. 3A).

The plurality of sub-light fluxes LL1 having passed through the multi-lens array 5 are superimposed on one another by the superimposing system 7 on the light incident surface 102R1. In the embodiment of the invention, the light incident surface 102R1 corresponds to a predetermined region irradiated with the superimposed sub-light fluxes.

Figure 3C:
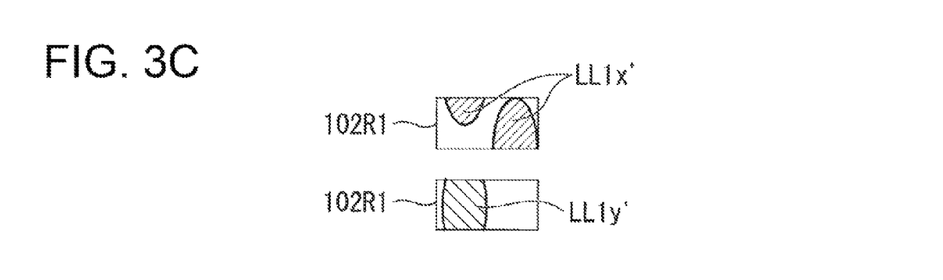
FIG. 3C shows irradiation patterns formed on a light incident surface.

FIG. 3C shows examples of an irradiation pattern formed on the light incident surface 102R1. A description will now be made of the relationship between the sub-light flux LL1$x$ immediately after it is produced by the diffractive optical element 6$x$ and an irradiation pattern LL1$x'$ formed on the light incident surface 102R1. The lenses 5a of the multi-lens array 5 and the superimposing system 7 allow the light incident surface (illumination receiving region) 102R1 of the light modulator 102R and the regions CA of the diffractive optical elements 6 described above to foe optically conjugate with each other. The irradiation pattern LL1$x'$ formed by the sub-light flux LL1$x$ on the light incident surface 102R1 is therefore similar to the cross-sectional shape of the sub-light flux LL1$x$ immediately after it is produced by the diffractive optical element 6$x$, as shown in FIGS. 3A and 3C. Similarly, an irradiation pattern LL1$y'$ formed by a sub-light flux LL1$y$ on the light incident surface 102R1 is similar to the cross-sectional shape of the sub-light flux LL1$y$ immediately after it is produced by the diffractive optical element 6$y$. The same holds true for irradiation patterns formed by the other sub-light fluxes LL1 on the light incident surface 102R1. When a plurality of irradiation patterns similar to the plurality of sub-light fluxes LL1 are superimposed on one another on the light incident surface 102R1, the light incident surface 102R1 is uniformly illuminated.

Figure 4:
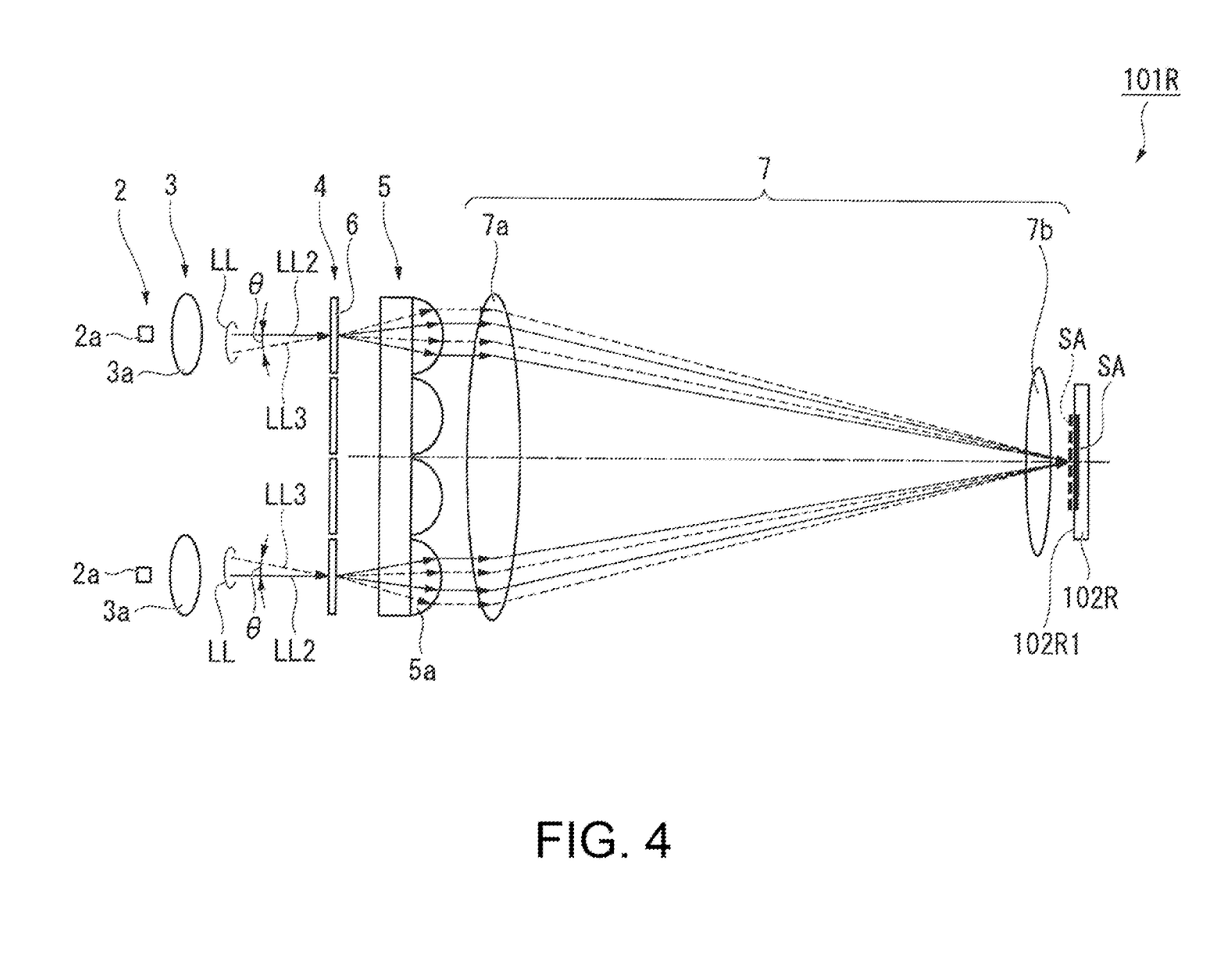
FIG. 4 describes an advantageous effect of the illuminator.

FIG. 4 describes an advantageous effect of the illuminator 101R according to the present embodiment.

Figure 5A:
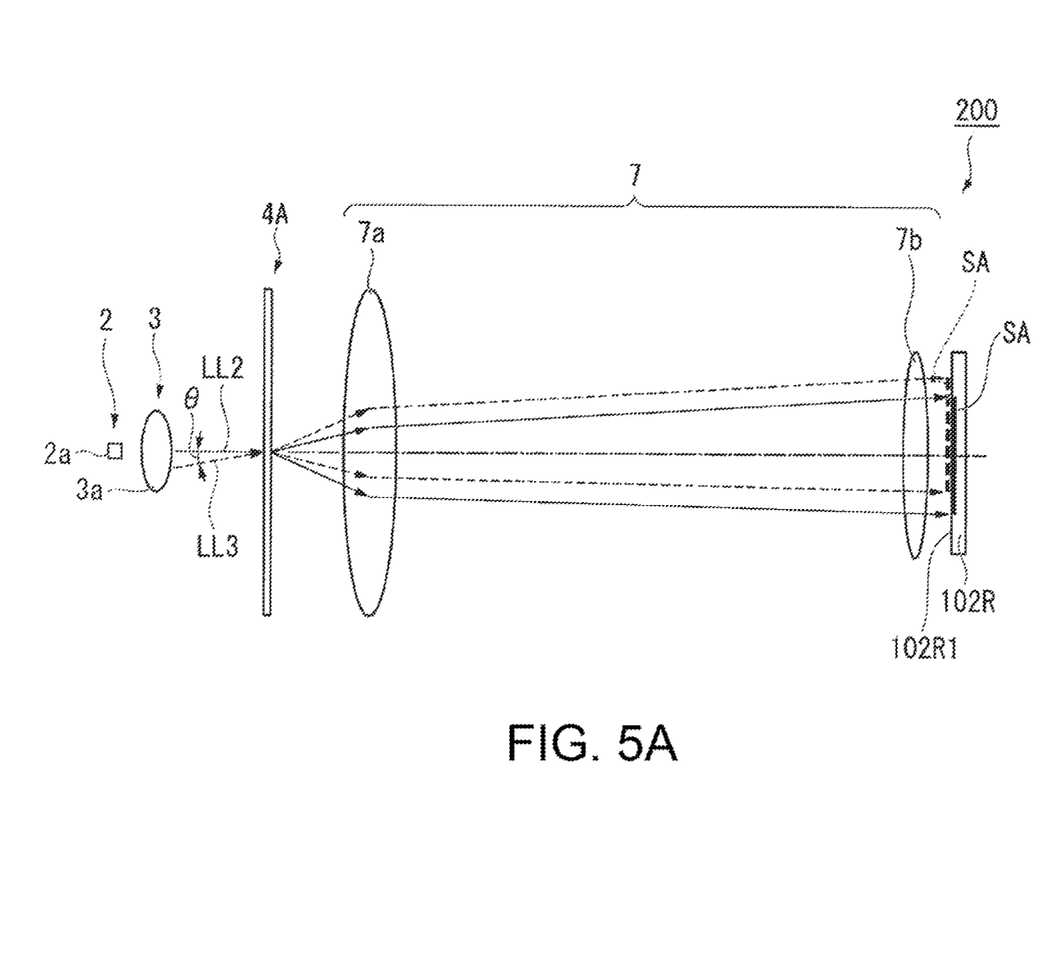
FIG. 5A shows an influence of the angle of incidence on an illuminated region, and FIG. 5B describes an illumination margin in related art.
Figure 5B:
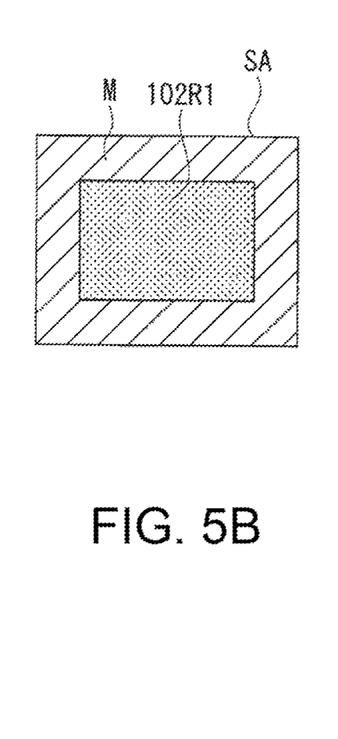

FIGS. 5A and 5B describe an illuminator 200' having a configuration of related art as a comparative example. FIG. 5A shows an influence of the angle of incidence of light incident on a diffractive optical element on a region illuminated with the light, and FIG. 5B describes an illumination margin in the related art.

In FIG. 4, the solid line represents a light flux LL2, which is part of the light flux LL incident on the diffractive optical member 4 in a case where no misalignment between the array light source 2 (semiconductor lasers 2a) and the collimator system (collimator lenses 3a) is present, and the broken line represents a light flux LL3, which is part of the light flux LL incident on the diffractive optical member 4 in a case where the misalignment is present.

In the illuminator 101R according to the present embodiment, the light incident surface 102R1 of the light modulator 102R is conjugate with the regions CA of the diffractive optical elements 6. The conjugate relationship prevents shift of the illuminated region on the light incident surface 102R1, for example, even when the array light source 2 or the collimator system 3 is misaligned leading to the change in the angle of incidence of the light incident on the diffractive optical member 4 (light fluxes LL2 and LL3). That is, the illumination light is allowed to be reliably incident on the light incident surface 102R1.

The conjugate relationship further allows the array light source 2 and the collimator system 3 to be aligned with each other without need of high precision, whereby the projector can be readily assembled, resulting in a reduction in manufacturing cost.

Further, if the array light source 2 and the collimator system 3 are misaligned with each other and the angle of incidence of the light incident on the diffractive optical member 4 (each diffractive optical element 6) changes by θ as shown in FIG. 4, the illuminated region on each of the lenses 5a shifts by fm×tanθ, where fm represents the focal length of the lens 5a.

To cope with the situation described above, the diffractive optical elements 6 may be so designed that the irradiated region of each of the lenses 5a has a margin with respect to the outer shape of the lens 5a, as shown in FIG. 3B. That is, a margin corresponding to the amount of shift of the illuminated region due to the misalignment only needs to be provided. The thus provided margin allows the sub-light flux LL1 from each of the diffractive optical elements 6 to foe reliably incident on the corresponding lens 5a even when the misalignment occurs.

On the other hand, in the illuminator 200 of related art, which includes no multi-lens array 5 (lenses 5a), on which divided light fluxes produced by a diffractive optical element 4A that divides the light from the light source section are to enter, when the angle of incidence of the light incident on the diffractive optical element 4A (light fluxes LL2 and LL3) changes by θ, an illuminated region SA on the light incident surface 102R1 of the light modulator 102R shifts by fc×tanθ as shown in FIG. 5A, where fc represents the focal length of the superimposing system 7.

Now, assuming that the focal length of the collimator system 3 (collimator lens 3a) is 5 mm, that the focal length fc of the superimposing system 7 is 150 mm, and that the array light source 2 and the collimator system 3 are misaligned with each other by 0.05 mm, the angle of incidence changes by 0.57 degrees (θ). In this case, the illuminated region shifts by 1.5 mm on the light incident surface 102R1 of the light modulator 102R.

For example, when the size of the light incident surface 102R1 is, for example, 12.8 mm×8 mm, the area of the region SA to be so illuminated as to uniformly illuminate the entire light incident surface 102R1 even when the angle of incidence changes by θ is 15.8 mm×11=173.8 mm$^2$, as shown in FIG. 5B. On the other hand, the area of the light incident surface 102R1 is 12.8 mm×8 mm=102.4 mm$^2$. That is, a necessary illuminated area as a margin M (obliquely hatched region shown in FIG. 5B) is 41.1% of the area of the illuminated region SA, which means that about 40% of the total amount of light is undesirably lost. As described above, in the illuminator 200 of related art, since the area of the illuminated region SA needs to be set in consideration of the misalignment, a very large amount of illumination light has been lost, In contrast, in the illuminator 101R according to the present embodiment, even when the degree of alignment of the mounted array light source 2 varies (mounting variation in semiconductor lasers 2a or collimator lenses 3a) leading to the shift of the incident direction of the light incident on the diffractive optical elements 6, the illuminated region SA will not shift off the light incident surface 102R1. The array light source 2 can therefore efficiently illuminate the light incident surface 102R1 with no light loss.

Further, to provide a margin that absorbs misalignment of the mounted array light source 2, diffraction characteristics of the diffractive optical elements 6 only need to be designed in accordance with the size of the lenses 5a, whereby the optical design can be readily made and the amount of manufacturing effort can be greatly reduced.

Moreover, according to the present embodiment, since the diffractive optical member 4 (each diffractive optical element 6) illuminates each of the lenses 5a in a relatively uniform manner over a wide area, the angular distribution of the light incident on the light modulator and hence the angular distribution of the light incident on a single point on the screen are widened, whereby the amount of speckle can be reduced.

Using the illuminators 101R, 101G, and 101B in the projector 100 can therefore improve the performance of the projector 100 itself, for example, suppression of decrease in illumination efficiency and reduction in the amount of speckle, whereby the projector 100 can display an image having excellent quality.

An embodiment of the invention has been described by way of example, but the invention is not necessarily limited to the embodiment described above and a variety of changes can be made thereto to the extent that the changes do not depart from the substance of the invention.

For example, in the embodiment described above, the diffractive optical member 4 is formed of a plurality of diffractive optical elements 6 independent of each other by way of example. The invention is not necessarily configured this way, and the diffractive optical member 4 may be formed of a single diffractive optical element. In this case as well, the diffractive optical member has a plurality of regions optically conjugate with a predetermined region, and the same advantageous effects as those provided in the embodiment described above can be provided.

For example, the above embodiment has been described with reference to the configuration including the collimator system 3, but the invention is not necessarily configured this way. When the array light source 2 emits highly parallelized laser beams, the collimator system 3 may be omitted. In this case, even when mounting variation in the array light source 2 occurs, providing each of the lenses 5a with a margin allows efficient use of the illumination light, as in the embodiment described above.

For example, in the embodiment described above, the projector 100 includes the three light modulators 102R, 102G, and 102B by way of example. The invention is also applicable to a projector that displays color video images (still images) by using a single light modulator. Moreover, each of the light modulators is not limited to the liquid crystal panel described above and can, for example, be a digital mirror device.

Further, in the embodiment described above, a surface-relief-type hologram element is used as each of the diffractive optical elements 6, and a volume-hologram-type element may instead be used. Moreover, a complex hologram element that is a combination of a surface-relief-type hologram and a volume hologram may be used.

The entire disclosure of Japanese Patent Application No. 2014-030617, filed on Feb. 20, 2014 is expressly incorporated by reference herein.

What is claimed is:

1. An illuminator comprising:
   a light source section having at least one solid-state light source;
   a diffractive optical member having a plurality of regions;
   a multi-lens array provided in a position downstream of the diffractive optical member and having a plurality of lenses corresponding to the plurality of regions in a one-to-one relationship; and a superimposing system provided in a position downstream of the multi-lens array,
wherein the plurality of regions of the diffractive optical member divide a light flux incident from the light source section into a plurality of sub-light fluxes,
each of the plurality of sub-light fluxes is incident on a corresponding lens of the plurality of lenses,
a predetermined region of a predetermined plane is illuminated with the plurality of sub-light flaxes having passed through the multi-lens array in such a way that the plurality of sub-light fluxes are superimposed on one another through the superimposing system, and
each of the plurality of regions is optically conjugate with the predetermined region.

2. The illuminator according to claim 1,
wherein each of the plurality of lenses has refractive power at least in a diffraction direction of the diffractive optical member.

3. A projector comprising:
an illuminator that radiates illumination light;
a light modulator that modulates the illumination light in accordance with image information to form image light; and
a projection system that projects the image light,
wherein the illuminator according to claim 2 is used as the illuminator.

4. The illuminator according to claim 1,
wherein the diffractive optical member is configured to shape the plurality of sub-light fluxes.

5. The illuminator according to claim 4,
wherein a first sub-light flux of the plurality of sub-light fluxes is produced by a first region of the plurality of regions, and
the first region is so configured that when the first sub-light flux is incident on a corresponding first lens of the plurality of lenses, the cross-sectional shape of the first sub-light flux has become closer to an outer shape of the first lens than the cross-sectional shape immediately after the first sub-light flux is produced by the first region.

6. A projector comprising:
an illuminator that radiates illumination light;
a light modulator that modulates the illumination light in accordance with image information to form image light; and
a projection system that projects the image light,
wherein the illuminator according to claim 5 is used as the illuminator.

7. A projector comprising:
an illuminator that radiates illumination light;
a light modulator that modulates the illumination light in accordance with image information to form image light; and
a projection system that projects the image light,
wherein the illuminator according to claim 4 is used as the illuminator.

8. The illuminator according to claim 1,
wherein at least one collimator lens is disposed between the light source section and the diffractive optical member.

9. A projector comprising:
an illuminator that radiates illumination light;
a light modulator that modulates the illumination light in accordance with image information to form image light; and
a projection system that projects the image light,
wherein the illuminator according to claim 8 is used as the illuminator.

10. A projector comprising:
an illuminator that radiates illumination light;
a light modulator that modulates the illumination light in accordance with image information to form image light; and
a projection system that projects the image light,
wherein the illuminator according to claim 1 is used as the illuminator.

* * * * *